US011801893B2

(12) United States Patent  
Van Poucke et al.

(10) Patent No.: US 11,801,893 B2  
(45) Date of Patent: Oct. 31, 2023

(54) STEERING CONTROLLER AND METHOD FOR STEERING A TRACKING PATH OF A TRAILER (71) Applicant: Spraying Systems Co., Wheaton, IL (US)

(72) Inventors: Tim Frans Van Poucke, Zwijnaarde (BE); Henrik Schiøler, Hjørring (DK); Jens Aksel Skjærbæk Søndergaard, Gandrup (DK)

(73) Assignee: Spraying Systems Co., Wheaton, IL (US)

( * ) Notice: Subject to any disclaimer, the term of this patent is extended or adjusted under 35 U.S.C. 154(b) by 230 days.

(21) Appl. No.: 17/320,844

(22) Filed: May 14, 2021

(65) Prior Publication Data

US 2021/0354754 A1 Nov. 18, 2021

Related U.S. Application Data

(60) Provisional application No. 63/144,563, filed on Feb. 2, 2021, provisional application No. 63/025,319, filed on May 15, 2020.

(51) Int. Cl.  
*B62D 13/00* (2006.01)  
*B62D 15/02* (2006.01)

(52) U.S. Cl.  
CPC ........... *B62D 13/00* (2013.01); *B62D 15/023* (2013.01); *B62D 15/025* (2013.01)

(58) Field of Classification Search  
CPC .... B62D 13/00; B62D 15/023; B62D 15/025; B62D 13/02; B62D 13/04; B62D 13/025; B60D 1/246; B60D 1/62; B60D 2001/008  
See application file for complete search history.

(56) References Cited

U.S. PATENT DOCUMENTS 7,147,241 B2 * 12/2006 Beaujot .................. A01C 7/208  
                                                                               280/441  
8,825,263 B1 * 9/2014 Nelson, Jr. ......... G01C 21/3617  
                                                                               701/25

(Continued)

FOREIGN PATENT DOCUMENTS

DE    102015206689 A1 * 10/2016 ............. B62D 13/00  
EP         3090922 A1    11/2016  
EP         3127782 A1 *   2/2017

OTHER PUBLICATIONS

Wang et al., Robust Model Predictive Control for Path Tracking of a Tracked Vehicle with a Steerable Trailer in the Presence of Slip, 2016, IFAC—PapersOnLine 49-16, pp. 469-474 (Year: 2016).*

(Continued)

*Primary Examiner* — Sze-Hon Kong  
(74) *Attorney, Agent, or Firm* — Leydig, Voit & Mayer, Ltd.

(57) ABSTRACT

A method and system are described for controlled supplemental steering, by actuating a supplemental steering element, of a trailing implement connectable via a hitch to a pulling source, and wherein the trailing implement includes a pair of parallel wheels, a controller, a position sensing system that generates a hitch position history comprising a stored set of recent positions of the hitch point, and a steering angle actuator. The method carried out by the system includes maintaining a history of positions of the hitch, determining a target steering angle for the supplemental steering element, and actuating the steering angle actuator in accordance with the target steering angle. During the maintaining the history of positions of the hitch, the history of positions of the hitch is updated by performing a rotation operation and a translation operation on a set of coordinates of the history corresponding to previous hitch positions.

24 Claims, 5 Drawing Sheets

(56) References Cited

U.S. PATENT DOCUMENTS

| | | | |
|---|---|---|---|
| 9,114,832 B2* | 8/2015 | Wang | A01B 69/006 |
| 9,370,977 B2* | 6/2016 | Sallis, Sr. | B62D 6/001 |
| 11,315,258 B1* | 4/2022 | Anagnostopoulos | G06T 7/246 |
| 2003/0167107 A1* | 9/2003 | Guesdon | B62D 13/04 |
| | | | 701/1 |
| 2004/0104555 A1* | 6/2004 | Atley | B62D 13/025 |
| | | | 280/426 |
| 2011/0202238 A1* | 8/2011 | Cebon | B62D 13/00 |
| | | | 701/41 |
| 2015/0210131 A1* | 7/2015 | Sallis, Sr. | B60D 1/173 |
| | | | 280/442 |
| 2016/0057921 A1* | 3/2016 | Pickett | A01B 69/008 |
| | | | 701/41 |
| 2021/0051837 A1* | 2/2021 | Barry | A01B 73/065 |
| 2021/0061353 A1* | 3/2021 | Miller | G01B 11/275 |
| 2021/0107565 A1* | 4/2021 | Biro | B62D 13/00 |
| 2023/0018452 A1* | 1/2023 | Nordberg | B60T 7/20 |
| 2023/0080456 A1* | 3/2023 | Fröjd | B62D 53/005 |
| 2023/0082801 A1* | 3/2023 | Laine | B62D 53/0864 |
| 2023/0154197 A1* | 5/2023 | Marschner | G06V 20/58 |
| | | | 382/104 |

OTHER PUBLICATIONS

European Patent Office, International Search Report in International Application No. PCT/US2021/032492 (dated Sep. 7, 2021).

* cited by examiner

STEERING CONTROLLER AND METHOD FOR STEERING A TRACKING PATH OF A TRAILER

CROSS-REFERENCE TO RELATED APPLICATIONS

This patent application claims the benefit of U.S. Provisional Patent Application No. 63/025,319 filed May 15, 2020, and U.S. Provisional Patent Application No. 63/144,563, filed Feb. 2, 2021, which are incorporated by reference.

AREA OF THE INVENTION

The present disclosure generally relates to systems and methods for controlling a path of a trailing implement (trailer) pulled at a hitch point. More particularly, the present disclosure relates to a measurement and control system where a plurality of sensor readings are processed to control a steering angle of a steering element, such as for example wheels of an axle of a trailer (trailing implement)—or drawbar pivot point angle—to achieve an improved tracking by the trailer of a pulling source (e.g. tractor) connected at a hitch point to the trailing implement.

BACKGROUND OF THE INVENTION

Figure 1:
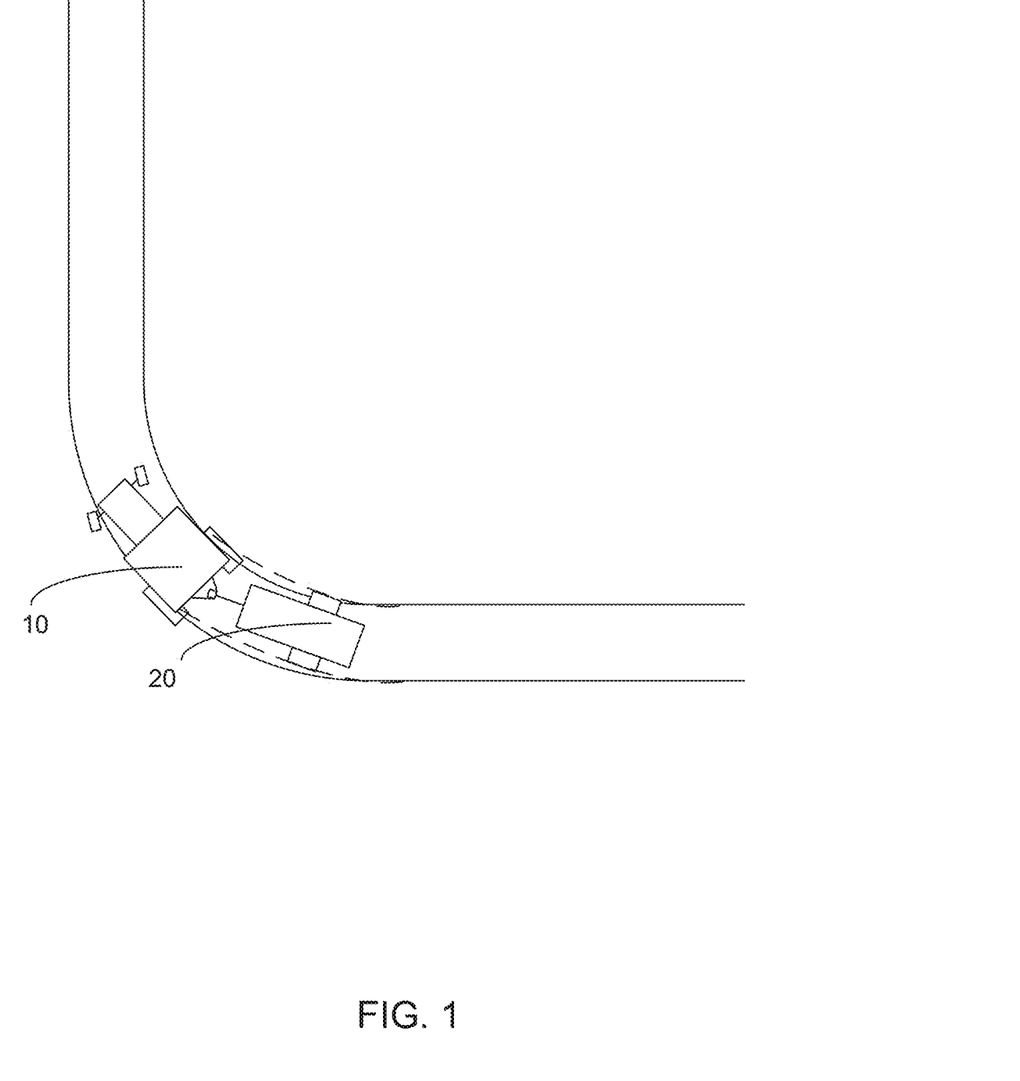
FIG. 1 is a schematic diagram of an exemplary tractor and following trailer connected at a hitch point, and a resulting veering path of the trailer arising from the absence of a trailer wheel steering system.

In farming, trailing farm implements, secured via a hitch point to a tractor, have been used to carry out a wide variety of operations. Such operations include: seeding, fertilizing, plowing, disking, weeding, etc. One problem faced by farmers when using trailing implements is that the trailing implement (trailer) tends follow an inwardly veering path with respect to a leading path of a tractor during tractor turns. This phenomenon (challenge) is illustratively depicted in FIG. 1. In the illustrative example, a tractor 10 follows a leading path (shown by a solid line). At a turning part of the leading path, a trailer 20 follows a veering path (shown by a dashed line). While such deviation from a tractor's path by the trailer may seem insignificant, such veering leads to excessive crop damage and poor crop production and/or excessive soil compaction at such locations in the field.

The "veering trailer" problem is addressed, for example, by equipping trailers with steerable wheels at the axels to counter the veering tendency of trailers having non-steerable wheels. When such steering is incorporated, the trailer has a far better ability to closely follow the (solid line) path of the tractor—as opposed to the (dashed line) path of trailers without steerable wheels.

Effective incorporation of tractor path following by use of trailer wheel steering is generally facilitated by a programmed controller (that may be located virtually anywhere) acting in real-time upon sensor signals indicative of a trailer's orientation relative to a pulling tractor. In a known system, a gyro mounted on the tractor (pulling the farm implement) senses changes in the tractor's direction, and causes a responsive change in the steering angle of the trailer wheels to counter the tendency of the trailer to otherwise veer inwardly from the tractor's path. In another example, one or more mechanical linkages (positioned on opposite sides of a hitch) physically actuate a turning angle measurement device during a tractor turn.

The aforementioned systems for controlling steerable wheels, while an improvement over fixed trailer wheels, pose a variety of problems to users. For example, the mechanical linkages create additional structures at the hitch point. Such structures must be maintained and can present maintenance issues for users. The tractor mounted system presents problems of calibration (for different positioning on the tractor) and a need to support a tractor-to-implement communication link.

SUMMARY OF THE INVENTION

A method is described herein for controlled supplemental steering, by actuation of a supplemental steering element (e.g., steering of a pair of steerable parallel wheels, modifying an angle of a drawbar extending from a hitch pivot point, etc.), of a trailing implement connectable via a hitch to a pulling source, and wherein the trailing implement includes a pair of parallel wheels, a controller, a position sensing system that generates a hitch position history comprising a stored set of recent positions of the hitch point, and a steering angle actuator. In such arrangement, the method includes: maintaining a history of positions of the hitch; determining a target steering angle for the supplemental steering element; and actuating the steering angle actuator in accordance with the target steering angle. During the maintaining the history of positions of the hitch, the history of positions of the hitch is updated by performing a rotation operation and a translation operation on a set of coordinates of the history corresponding to previous hitch positions. Furthermore, the set of coordinates of the history are specified in a current reference coordinate system, and the rotation operation and translation operation are based upon a rotation and a translation between: a first position corresponding to a previous hitch position corresponding to the current reference coordinate system, and a second position corresponding to an updated hitch position corresponding to an updated reference coordinate system.

Additionally, a trailing implement steering control system is described for carrying out a controlled supplemental steering, by actuation of a supplemental steering element (e.g., steering of a pair of steerable parallel wheels, modifying an angle of a drawbar extending from a hitch point, etc.), of a trailing implement connectable via a hitch to a pulling source, and wherein the trailing implement includes a pair of parallel wheels, and a steering angle actuator. In such arrangement, the trailing implement steering control system comprises: a controller; and a position sensing system providing sensor signals to the controller. The controller generates a hitch position history comprising a stored set of recent positions of the hitch point in a current reference coordinate system. The controller executes programmed instructions provided on a non-transitory computer readable medium to facilitate the trailing implement steering control system carrying out a method that includes: maintaining a history of positions of the hitch; determining a target steering angle for the supplemental steering element; and actuating the steering angle actuator in accordance with the target steering angle. During the maintaining the history of positions of the hitch, the history of positions of the hitch is updated by performing a rotation operation and a translation operation on a set of coordinates of the history corresponding to previous hitch positions. Furthermore, the set of coordinates of the history are specified in a current reference coordinate system, and the rotation operation and translation operation are based upon a rotation and a translation between: a first position corresponding to a previous hitch position corresponding to the current reference coordinate system, and a second position corresponding to an updated hitch position corresponding to an updated reference coordinate system.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

In the present disclosure, a robust system and method are described to determine a steering angle of a supplemental steering element (e.g., steerable wheels, a steerable drawbar, etc.) of a trailer pulled via a hitch of a tractor.

Figure 2:
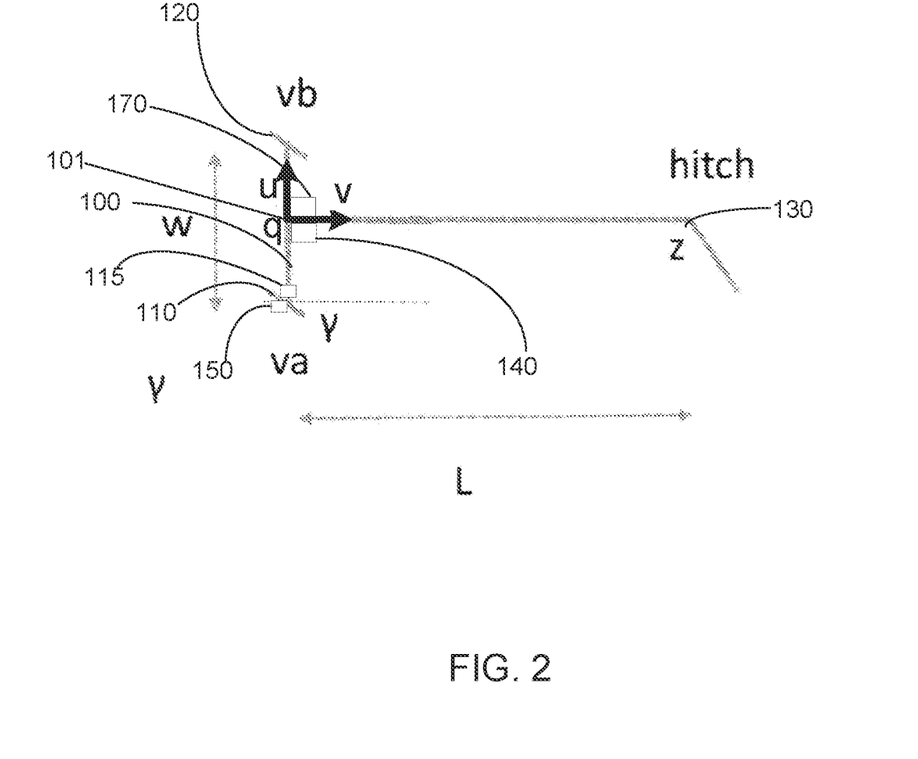
FIG. 2 is a schematic overhead/plan view of a trailer physical model (including control/sensor elements) to which a trailer (trailing implement) wheel steering control system of the present disclosure is applicable in accordance will an illustrative example.

Turning to FIG. 2, a trailer steering model, in accordance with an illustrative example of the present disclosure, is characterized by an axle 100 having a width (w) and an origin point (q) that corresponds to an origin on a reference coordinate system (discussed further herein below). The axle 100 is connected to a right wheel 110 (having a linear velocity (va) measured, for example by a tachometer 115) and a left wheel 120. In another illustrative example of the current disclosure, the tachometer 115 is mounted to measure a linear velocity (vb) of the left wheel. In yet another example, depicted in FIG. 6, two tachometers are mounted to respective ones of the right wheel 110 and the left wheel 120. The disclosure of a trailer steering system for improved tracking is not limited to any particular sensors for measuring linear movement (or even absolute position of trailer points of interest, such as use of GPS devices).

In the illustrative example, the origin point (q) is a distance L along a line orthogonal to the axle 100 from an attachment (hitch) point z of a hitch 130 of the trailer to the axle 100.

In the illustrative example, the origin point (q) has a linear velocity (dq) in a direction defined by a current rolling direction and speed of the steerable right wheel 110 and left wheel 120 having a steering angle referred to herein as "gamma." In FIG. 2, when the steering angle "gamma" is zero, the rolling direction of the wheels 110 and 120 is orthogonal to the axle 100. The velocities, in the illustrative example, are all two dimensional (i.e. in a plane), which is a good approximation for a trailer steering process described herein.

With continued reference to FIG. 2, a unit directional vector (v) is a unit vector along an orthogonal path from the origin point (q) to the hitch point (z) of the trailer. A unit orthogonal vector (u) is a unit vector orthogonal (in the reference coordinate system of the two-dimensional planar model) to the unit directional vector (v).

Thus, in summary of the model described herein above, the unit orthogonal vector (u), the unit directional vector (v) and the origin point (q) on the axle 100 define the reference coordinate system with an origin (0,0) at a point (q) in the aforementioned two-dimensional plane. In the illustrative example, where the hitch point is on an orthogonal line extending from a midpoint on the axle 100, the origin of the reference coordinate system is at a midpoint 101 on the axle 100. The unit directional vector (v) is aligned with the horizontal x axis of a reference coordinate system. The unit orthogonal vector (u) is aligned with the vertical y axis of the reference coordinate system. As the trailer moves and/or rotates, a translation and rotation operation is carried out on all points currently constituting the hitch position history (H) according to a current reference coordinate system of the trailer where: the origin point (q) (the midpoint 101) on the axle 100 is the origin of the reference coordinate system, the unit directional vector (v) runs along the x axis, and the unit orthogonal vector (u) runs along the y axis.

A rotation sensor 140 (e.g. a gyroscope), which is mounted at any fixed position on the trailer (e.g. on the axle 100), provides rotational information (e.g. rotational velocity) that facilitates determining a current rotational angle of the trailer in relation to a previously established reference coordinate system (i.e. the reference coordinate system used to establish a currently stored sequence of hitch positions of the hitch point history (H)). By way of example, the rotation sensor 140 measures a rotational velocity of the trailer. Readings of the rotation sensor 140 position output signal render an angular velocity (o) of the unit directional vector (v) that, in turn, are used to determine a relative change in direction of the unit directional vector (v) (e.g., in relation to the unit directional vector (v) direction used to calculate the currently stored version of the hitch point history (H)). The relative change in direction, in turn, is used to carry out a rotational adjustment to the sequence of point positions in the hitch position history (H) with respect to a preceding reference coordinate system. Other rotation sensor types are contemplated for the rotation sensor 140. Instead of a gyroscope, in alternative arrangement other MEMs devices are contemplated including accelerometers and compasses. It is noted that, in illustrative examples, the absolute direction of the trailer is not relevant.

Additionally, a target steering angle (gamma) is a control output of the control operation that specifies a parallel steering angle of the right wheel 110 and the left wheel 120 (monitored and measured by a steering angle sensor 150. A value of zero degrees by the steering angle sensor 150 corresponds to the wheels 110 and 120 being aligned with the unit directional vector (v)—i.e. a "non-steering" state. Any type of angle sensor may be used for the steering angle sensor 150 as the type of steering control actually used to carry out a steering of the trailer intended is not an essential element to carrying out the disclosed illustrative examples of a trailer steering control.

In the illustrative example, a sampling time (dT) corresponds to the period between calculations of the current position of the hitch point (z) of the hitch 130.

In the illustrative trailer steering control arrangement, implemented by a controller 170 and described herein below, the controller 170 receives and processes two distinct sensed raw data value signal (process variables) of interest that the controller 170 processes to generate a set of parameter values that are used by the controller 170 to update the hitch position history (H) points and carry out a steering control in accordance with the disclosure. First, a current rotational velocity of the trailer is acquired. By way of example, the rotational velocity is provided by the rotation sensor 140 (e.g. a gyroscope). The rotational velocity is processed in conjunction with an elapsed time to render an estimate of rotation of the trailer over the elapsed time. In an alternative example, the amount of rotation over the elapsed time is directly measured by a compass. In alternative examples yet other sensor types (or combinations thereof) are used to establish an amount of angular rotation of the trailer during the elapsed time (dT). By way of example, the "elapsed time" (dT) is a time period between sequential determinations of current hitch position that constitute a hitch position history (H)).

Second, a current forward speed of the trailer is determined using, for example, the tachometer 115 mounted proximate/on one of the wheels (right wheel 110 in the illustrative example). As noted above, the tachometer 115 may be mounted, alternatively and/or additionally on the left wheel 120 in accordance with other examples in accordance with the disclosure (see FIG. 6, described herein below).

The first (rotational sensor) sensed parameter and the second (forward speed of a trailer wheel) are processed in combination to render a current hitch position in a reference coordinate system. In the illustrative example, the reference coordinate system is defined by the axle 100 (the y-axis) and the unit directional vector (v) that meet at a point on the axel 100 that constitutes the origin (0,0) of the reference coordinate system.

A steering angle of the parallel wheels, a control output of the described system is continuously monitored/measured by the steering angle sensor 150. As noted above, a zero steering angle corresponds to the wheels 110 and 120 running in a line parallel to the unit directional vector (v). In the illustrative example, the wheels 110 and 120 of the trailer are always in alignment with one another, regardless of a measured/controlled current value of the steering angle of the wheels 110 and 120 in relation to the unit directional vector (v) indicated by the steering angle indicated by the steering angle sensor 150.

Having described a model upon which a real-time steering control, by the controller 170, of wheels 110 and 120 is based, an exemplary calculation of the current steering angle (essentially instantaneously carried out by a steering actuator) of the parallel wheels 110 and 120 will now be described with reference to a continuous control process summarized, by way of example, in FIG. 3.

Figure 3:
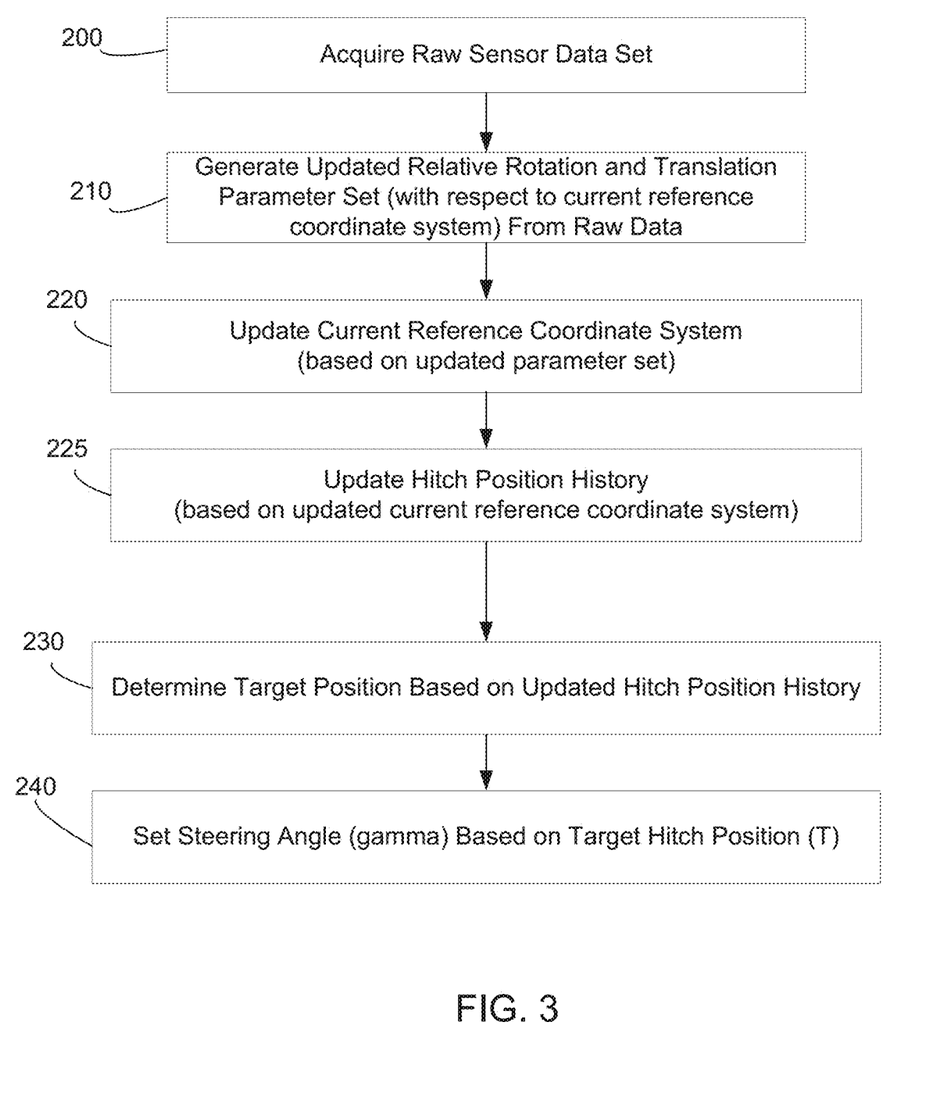
FIG. 3 is a flowchart summarizing a simple/simplified (e.g. unfiltered) control loop for steering a trailer to follow a hitch point path in accordance will an illustrative example.

Turning to FIG. 3, a flowchart summarizes steps for an exemplary method of acquiring and processing a set of raw data points, deriving an updated history (H) of hitch positions (specified in the reference coordinate system described previously herein above), and rendering a current steering wheel angle for a trailer in accordance with the model and sensor data described herein above with reference to FIG. 2.

During 200, raw sensor data is acquired corresponding to: a current angular rotation of trailer provided by the rotation sensor 140 (e.g. an angular velocity rendered by a gyroscope), and the current wheel speed (sensed, for example, by the tachometer 115).

During 210, based upon the two values determined during 200 (and the previously determined position of the hitch—i.e. z(n−1)), the controller 170 renders a relative rotation and a relative translation of the trailer hitch position in relation to a current reference coordinate system—where the current reference coordinate system is established during the preceding update period such that the current hitch position z(n) is at (L, 0) in the current reference coordinate system. The relative rotation and the relative translation of the trailer, determined during 210, is subsequently used to perform a rotation and translation of the hitch position points making up the current version of the hitch position history (H) to render an updated hitch position history (H') during current reference coordinate system and history (H) update operations 220 and 225 discussed herein below. However, prior to the aforementioned rotation and translation operations to render an updated current reference coordinate system and updated hitch position history comprising previous hitch positions expressed as coordinates in the updated current reference coordinate system, during 210 the controller 170 renders trailer movement parameter values that are derived from one or more instances of the two sensed parameter values acquired during 200. Such hitch movement parameters include: (1) a rotation of the trailer, and (2) a forward distance traveled by the trailer along the unit directional vector (v) in the current reference coordinate system. By way of example, the controller 170 processes the raw sensor data acquired during 200 to render a set of derived trailer movement parameter values that facilitates updating the current reference coordinate system using the currently calculated relative rotation and translation parameters over the current hitch position sampling period (without the aid of a GPS device). The current reference coordinate system is updated such that, upon completion, a current hitch position z(n) is at position (L,0) in the updated current reference coordinate system.

By way of a particular example, the relative rotation and translation parameters are determined (so that the current hitch position history can be updated according to the updated current reference coordinate system) according to the following series of computations. In the first part, a forward velocity (dq) of the origin point (q) along the unit directional vector (v)—i.e. the current rolling direction and speed of the steerable wheels 110 and 112 (as determined by the current steering angle "gamma")—is determined as follows:

Assumption (no sideways sliding for midpoint q)

$$dq = cR(\gamma)v \quad (1)$$

(general expression for translational velocity of q)
(where R(a) is a 2D rotation operator (matrix) of angle "a")

$$va = dq + ovw/2 \quad (2)$$

$$vb = dq - ovw/2 \quad (3)$$

(translational velocity of wheel midpoints)

$$\langle R(\gamma)v, vb \rangle \quad (4)$$

(speed along wheel (measured as Tach_b))

$$c = \langle dq, R(\gamma)v \rangle = \langle (va+vb)/2, R(\gamma)v \rangle = (\langle va, R(\gamma)v \rangle + \langle vb, R(\gamma)v \rangle)/2 \quad (5)$$

(express c from va,vb and γ—using (1), (2), (3) and (4))

$$\langle (va-vb), R(\gamma)v \rangle = o \ w \langle v, R(\gamma)v \rangle = o \ w \cos(\gamma)$$

$$\langle va, R(\gamma)v \rangle = \langle vb, R(\gamma)v \rangle + o \ w \cos(\gamma) \sim \langle vb, R(\gamma)v \rangle + ow \quad (6)$$

(express $\langle va, R(\gamma) v \rangle$ from $\langle vb, R(\gamma) v \rangle$ and o—using (2) and (3))

Altogether dq=c R(γ) v=($\langle vb$, R(γ) v$\rangle$+o w/2) R(γ) v=(Tach_b+o w/2) R(γ) v (express translational velocity dq from Tach_b, o and γ—using (5) and (6))

The calculated current forward velocity and the current rotational velocity (current rotation) are subsequently used to determine a current hitch position history within the current reference coordinate system—a reference coordinate system where the updated current hitch position in the hitch position history (H) is always at a position having the coordinates (L,0).

In an illustrative embodiment, the hitch position history (H) is implemented by/on the controller 170 as a (circular) buffer consisting of a most-recent "x" points, where x can be any of a wide variety of quantities. In particular, the number of most-recent hitch positions maintained by the controller 170 is based upon one or more of a variety of factors including, for example: sensor sampling rate, control loop period, trailer maximum linear speed, angular/rotational speed, steering controller speed, etc.

During 220, the controller renders an updated reference coordinate system based upon the rotation of the trailer and linear travel of the origin point determined during 210. Upon completion of 220, the origin point (q) is at point (0,0) and the hitch point is at (L,0) of the updated reference coordinate system.

During 225, the controller updates the coordinates of the hitch position history (H) in accordance with the updated current reference coordinate system. As such during 225, the controller performs a rotation and translation upon points of the hitch position history (H), in accordance with the updated reference coordinate system to render an updated hitch position history (H'). While identified as two distinct operations, the rotation and translation of the current reference coordinate system and the rotation and translation of the points making up the hitch point history, in accordance with the rotation and translation of the current reference coordinate system, can be carried out as a single consolidated operation (merging steps 220 and 225 into a single operation).

In the illustrative example, during 225, for each iteration of determining/updating the hitch position history (H) in accordance with the updated current reference coordinate system, the hitch positions of the current hitch position history (corresponding to the current reference coordinate system) are rotated and translated (in view of the rotation and translation of the trailer at the origin point (q)) according to the following:

Update of H at every previously registered/sampled hitch position
where R(a) is a 2D rotation operator (matrix) of angle "a"
z'(i−1)=R(−o dT) z'(i) (rotation of (v,u,q)) for i in {2, 3, . . . , n}
(rotate all previous points with −o dT for a rotation of UPDATED reference coordinate system with o dT)
z'(j)=z'(j)−dT dq (translation) of (v,u,q)) for i in {1, 3, . . . , n−1}
(translate all previous points with −dT dq for a translation of UPDATED reference coordinate system with dT dq)
z'(n)=(L,0) (by definition)
(insert most recent hitch point in history at position (L, 0))

Upon completion of 225, each of the current hitch points in the history (H) is specified in the "updated reference coordinate system"—including the most recent point at (L, 0), and the "updated reference coordinate system" thus becomes the "current reference coordinate system" for purposes of acquiring and processing a next hitch position (per the operations described herein above with reference to FIG. 3).

Figure 4:
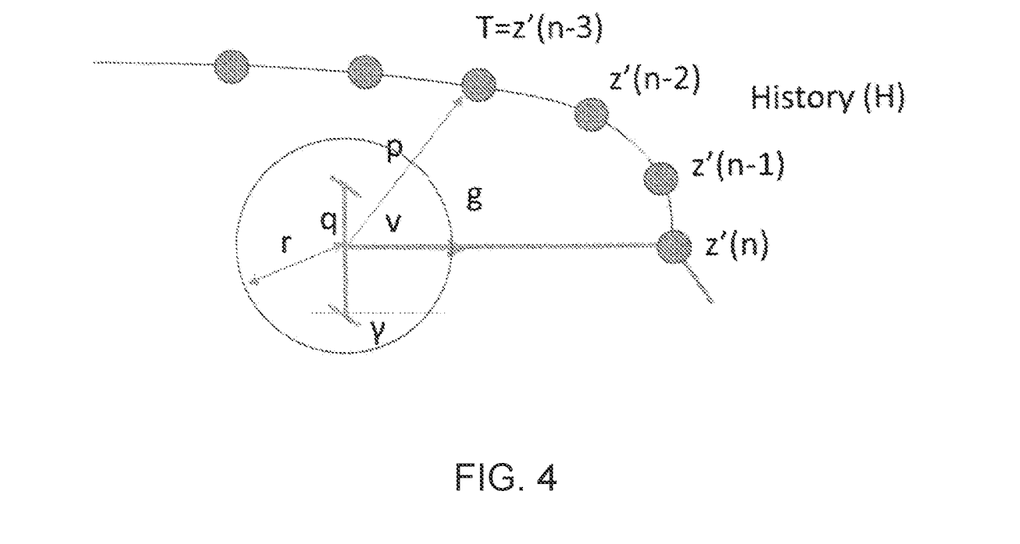
FIG. 4 provides an illustrative set of sampling points of a hitch point path (hitch position history) in accordance with an illustrative example.

During 230 (and with reference to an example of hitch position history (H) depicted in FIG. 4) a target hitch position (T), of the target hitch position history (H) is determined. By way of example, FIG. 4 depicts the updated hitch position history (H') comprising a series of sampled hitch positions z(n−5) to z(n) for the hitch 130 position (z) during the acquisition of 6 samples of the above-mentioned three sensed parameters (i.e., direction of trailer, wheel speed, and wheel steering angle). In the illustrative example, the target hitch position (T) is determined by identifying a closest "qualified" one of the past hitch positions contained in the hitch position history (H) updated during 220 to a current position of the trailer axle origin point (q). While some registered past hitch positions may be closer, such points may be disqualified during a qualification operation. In an illustrative example, qualifying a hitch position within history (H) for consideration during 230 comprises two applied limitations:

(1) a distance from (q) to the historical hitch position (e.g. the line (p) from (q) to the historical position z'(n−3)) must be greater than radius (r) defining a circle of exclusion around (q) for the purpose of improving the stability/robustness of the proposed target hitch position determination procedure; and (2) an angle (g) between the line (p) and the unit directional vector (v) must be less than a maximum angle magnitude (a).

Figure 5:
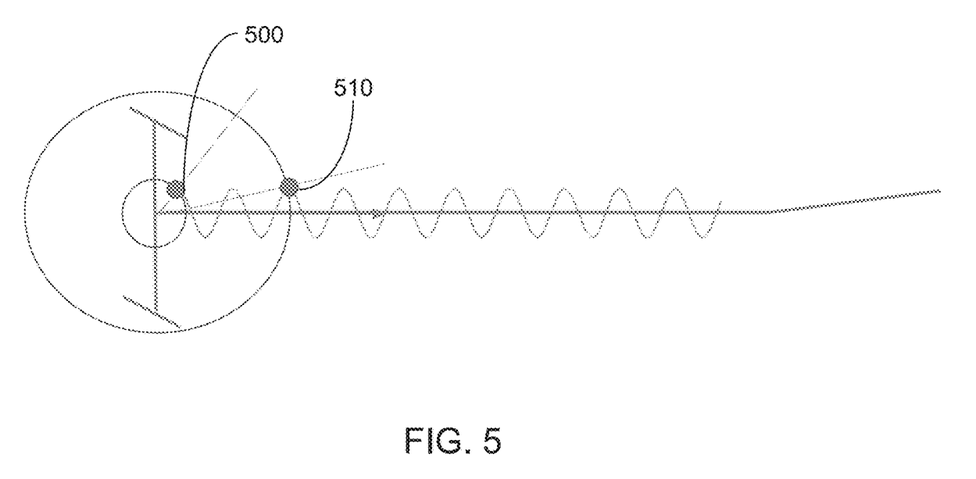
FIG. 5 provides an illustrative set of sampling points of a hitch point path (hitch position history) in accordance with another illustrative example.

Turning to FIG. 5, an illustrative set of sampling points of a hitch point path (hitch position history) are provided to show the significance of using the radius (r) limitation. In this particular case, the older hitch points (falling within the radius (r)) would cause several unnecessary (and potentially detrimental) steering angle changes. On the other hand, the more recent hitch positions (falling outside the radius r) provide more desirable steering targets. Thus, the imposition of a "radius of exclusion" helps to eliminate an otherwise detrimental "oversteering"—which would occur if a nearest point 500 was selected instead of a nearest point outside the radius of exclusion 510.

In the illustrative example of FIG. 4, the point z'(n−4) is closer than z'(n−3). However, z'(n−4) has an angle that exceeds the maximum angle magnitude (a)—resulting in disqualification.

During 240 the controller 170 issues actuator control signals to one or more steering actuators to carry out a steering angle change in accordance with a steering angle that directs the parallel steerable wheels 110 and 120 to roll in a direction parallel to the vector (p) from the axle origin point (q) to the target hitch position (T) determined during 230. The determined angle may be directly applied to set the steering angle of the wheels 110 and 120. However, in accordance with illustrative examples, the specified steering angle is a target value that is further processed to render an actual steering control command. Examples of modifications including filtering, oversteering, time-delays, changed angle limits (both minimum and maximum), etc.

In general, it is desirable to sample (and execute a control output in a control loop) as frequently as practical to provide smooth operation of the steering (i.e. avoiding large changes to the change in steering angle of the wheels 110 and 120 in any single control loop iteration). Moreover, in cases where—in rare instances—the changes are deemed too large, filtering and/or maximum change limits (per wheel steering control loop iteration) may be imposed on an initial steering angle generated by the controller 140. Similarly, to reduce wear on steering actuators, a minimum change floor (per wheel steering control loop iteration) may also be imposed. Thus, any steering position changes are kept within a range between a maximum steering change and a minimum steering position change. Additionally, a variety of filtering schemes may be incorporated into the steering control scheme implemented by the controller 170.

Figure 6:
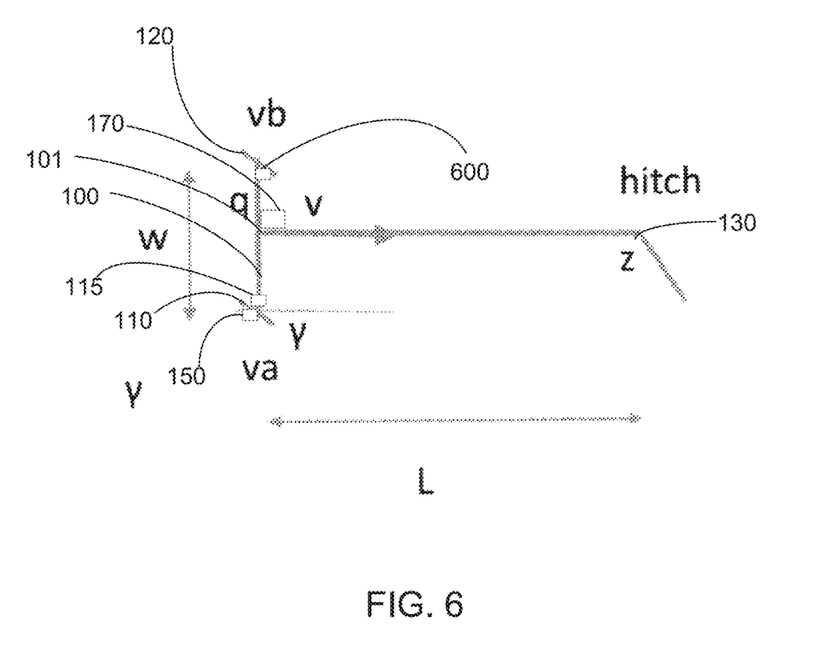
FIG. 6 is a schematic overhead/plan view of a trailer physical model (including control/sensor elements) to which a trailer (trailing implement) wheel steering control system of the present disclosure is applicable in accordance will an illustrative example.

Turning briefly to FIG. 6, a schematic overhead/plan view is provided of a trailer physical model (including control/sensor elements) to which a trailer (trailing implement) wheel steering control system of the present disclosure is applicable in accordance with another illustrative example. In the illustrative example, a second tachometer 600 is used with the 115 to determine the relative rotation and translation parameter values discussed herein above. In such case, relative rotation and translation of the trailer is determined using linear displacement differences between the linear distances established by the tachometer 115 and the second tachometer 600. As such, the rotation sensor 140 is not needed in the example provided in FIG. 6. In this case the angular rotation and forward velocity (along the unit vector (v)) are determined as follows:

Assumption (no sideways sliding for mid point q)

$$dq = cR(\gamma)v \quad (1)$$

$$va = dq + ovw/2 \quad (2)$$

$$vb = dq - ovw/2 \quad (3)$$

$$\langle R(\gamma)v, va\rangle \text{speed along wheel(measured as Tach\_a)} \quad (4)$$

$$\langle R(\gamma)v, vb\rangle \text{speed along wheel(measured as Tach\_b)} \quad (5)$$

$$c = \langle dq, R(\gamma)v\rangle = \langle (va+vb)/2, R(\gamma)v\rangle = (\langle va, R(\gamma)v\rangle + \langle vb, R(\gamma)v\rangle)/2 = (\text{Tach\_a} + \text{Tach\_b})/2 \quad (6)$$

(express c from Tach_a+Tach_b—using (1)-(5)) So $$dq = c\, R(\gamma)v = R(\gamma)v(\text{Tach\_a} + \text{Tach\_b})/2$$

(express translational velocity dq from Tach_a+Tach_b— using (1) and (6))

$$(\text{Tach\_a} - \text{Tach\_b}) = \langle (va-vb), R(\gamma)v\rangle = o\,w\langle v, R(\gamma)v\rangle = o\,w\cos(\gamma) =$$

$$\Rightarrow$$

$$o = (\text{Tach\_a} - \text{Tach\_b})/(w\cos(\gamma)) \sim (\text{Tach\_a} - \text{Tach\_b})/w.$$

(express angular velocity o from Tach_a and Tach_b— using (2)-(5))

Figure 7:
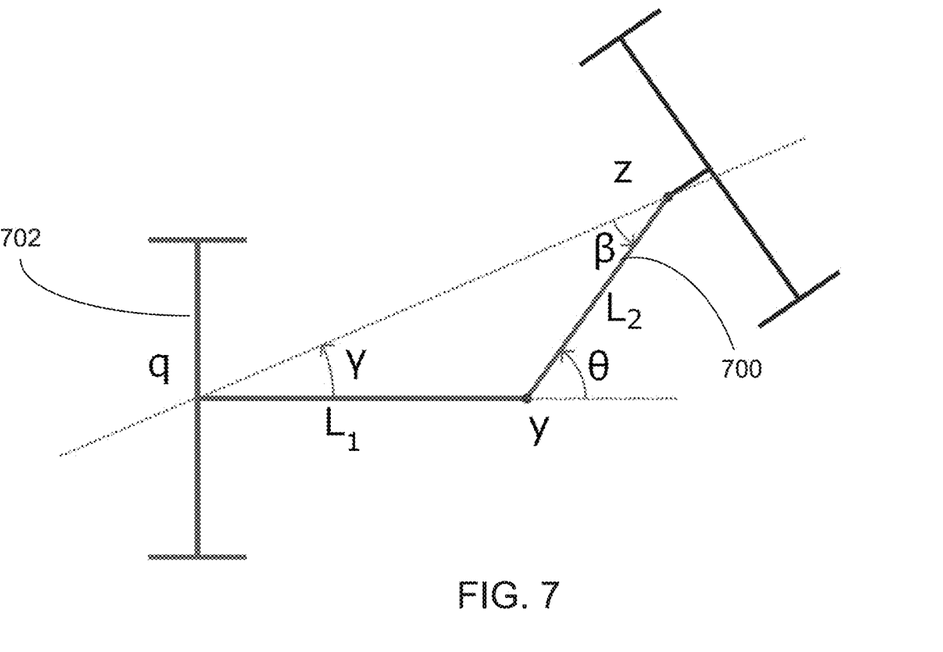
FIG. 7 is a schematic overhead/plan view of a trailer/steerable drawbar physical model (including labels defining parameters of interest) for a drawbar-based steering control where a path of a trailer (trailing implement) with non-steerable wheels is connected in accordance with an illustrative example.
Figure 8:
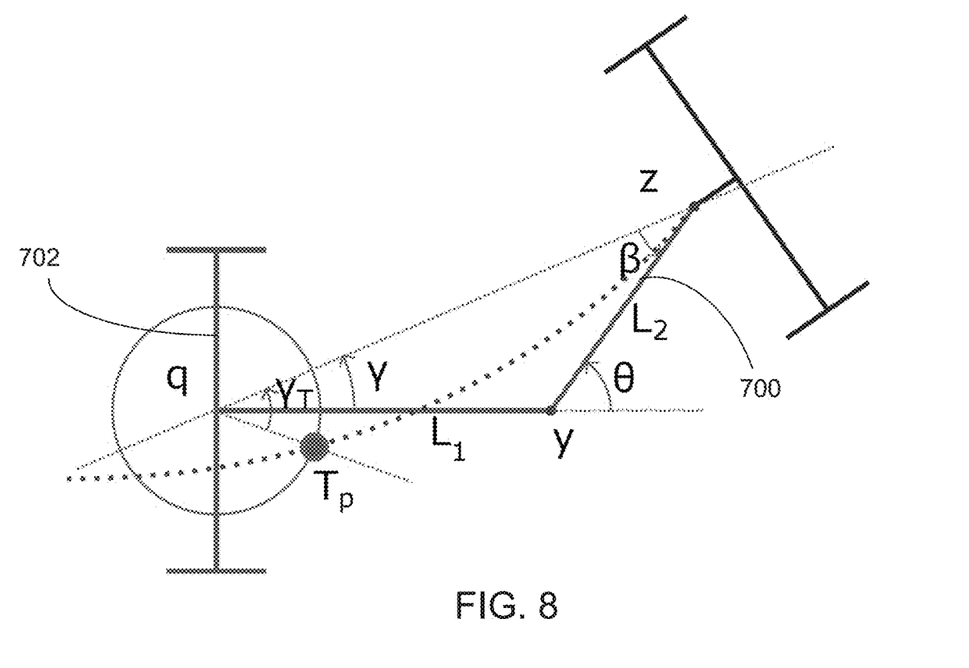
FIG. 8 is a schematic overhead/plan view of the trailer/steerable drawbar physical model of FIG. 7 that is augmented by a target path in an illustrative example of drawbar-based steering of the trailer to follow a wheel path of a pulling apparatus.

Turning to FIGS. 7 and 8, a further illustrative example of trailer steering in accordance with the current disclosure is provided for drawbar-based steering of a trailing implement (where the wheels of the implement remain fixed in position during the trailer steering). Steering is affected, in this case, by varying an angle θ formed at a rotating pivot point y at: (1) a distal end of a drawbar 700 extending a distance L2 from a pulling tractor, and (2) a line running a distance L1 from an axle 702 along a line orthogonal to the hitch point y. In this arrangement, the variable angle θ is controlled to counter-steer the trailer with respect to the tractor path (turning the trailer relatively to the left during a right turn in the path of the center y of the tractor axle.

In the illustrative example of FIGS. 7 and 8, the steering principle for drawbar steering follows the same methodology. A hitch position (in this case at a pivoting hitch connection point between the drawbar 700 and the tractor at y) is defined. The history of these points (i.e., z(n)) with respect to the trailer reference frame is kept. Based on this history, a target hitch position is identified. From the target hitch position, the necessary drawbar pivot point angle θ is chosen to align vector v (orthogonal to the center of the trailer axle) with the target hitch position.

In this algorithm, no sliding of the wheels is assumed. Similar to the above-described example involving steerable trailer wheels, the following equations are provided describing the path of the trailer pulled by the trailer via a steerable drawbar:

$\dot{q} = c*v$, where v is the unit vector pointing from q to z in FIG. 7.

$$v_a = \dot{q} + o*v*\frac{w}{2}$$

$$v_b = \dot{q} - o*v*\frac{w}{2}$$

Simpler than the wheel-based trailer steering case discussed above, we have $$c = \left(v_b + o*\frac{w}{2}\right),$$

resulting in $$\dot{q} = \left(v_b + o*\frac{w}{2}\right)*v = \left(tach_b + o*\frac{w}{2}\right)*v$$

This can be done in similar way when two tachometers are used (instead of tachometer & gyro in the above example). It then comes down to $$\dot{q} = c*v = \frac{tach_a + tach_b}{2}*v \text{ (i.e. calculate speed)}$$

$$o = \frac{tach_a - tach_b}{w} \left(\begin{array}{l}\text{i.e. calculate equivalent}\\ \text{for gyroscope measurement}\end{array}\right)$$

The hitch position z(n) history update, described herein above with regard to the wheel-based steering, is adjusted in accordance with the introduction of the drawbar 700 having a length $L_2$ that is interposed between point y (extending from the trailer) and the hitch point at z. Both point z and point y represent rotatable pivot points between the hitch (at z) and the trailer connection point (at y). In accordance with the disclosure, the angle of rotation (θ) at y is controlled to affect a supplemental steering of the trailer. As such, the hitch position of interest z(n) for purposes of controlling steering of the trailer is not at the pivot pointy (L1,0)—which was used for wheel steering. Rather the historical position of interest is at "z" (i.e. the point where the drawbar 700 attaches at a hitch point on the tractor. The point (z'), at hitch point z in FIGS. 7 and 8, is represented as:

$$z'(n)=[l_1;0]+R(\theta)[l_2;0]$$

With $\theta$, $l_1$ and $l_2$ as defined in FIG. 7. $R(\theta)$ is the 2D rotation matrix, as defined above with regard to the above-described wheel-based steering control arrangement.

From the hitch position history, a point is selected which produces an angle $\gamma_T$ as seen in FIG. 8. The actuated angle is $\theta$ however. Using trigonometric identities, $\theta_T$ can be deduced from $\gamma_T$. Following the notations in FIG. 7:

$$\frac{\sin(\gamma)}{l_2} = \frac{\sin(\beta)}{l_1} \Rightarrow \sin(\beta) =$$

$$\frac{l_1 * \sin(\gamma)}{l_2} \text{ (i.e. applying the sine rule for triangles)}$$

$$\beta = \operatorname{asin}\left(\frac{l_1 * \sin(\gamma)}{l_2}\right)$$

$$\pi - \theta + \gamma + \beta =$$

$$\pi \Rightarrow \theta = \gamma + \beta \text{ (i.e. sum of the angles in a triangle is equal to } \pi\text{)}.$$

Combining the above equations, target angle $\theta_T$ (needed to point the trailer vector v in the direction of the determined target hitch point) is provided as follows:

$$\theta_T = \gamma_T + \operatorname{asin}\left(\frac{l_1 \sin(\gamma_T)}{l_2}\right)$$

As such, the steering of a trailer through dynamic auxiliary steering elements (e.g. trailer wheels, drawbar angle (at point y) with respect to the unit vector v) has been described herein. The selection of target points, in the manner described herein, as well as the dynamic steering via the auxiliary steering elements facilitates superior tracking of trailer wheels in the path of a pulling tractor.

Furthermore, while the illustrative examples have been depicted and described with reference to a single axle trailer system, the disclosure is not limited to such systems. It will be readily appreciated that, in view of the current disclosure, the advantages of the current disclosure are also applicable to multi-axle trailers. As such, the current disclosure is intended to apply to trailer systems that include one or more axles—with appropriate adjustments to the above-described determinations to accommodate variations in turning characteristics arising from the present of multiple axles and/or sets of steerable wheels attached thereto.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for controlled supplemental steering, by actuation of a supplemental steering element, of a trailing implement connectable via a hitch to a pulling source, and wherein the trailing implement includes a pair of parallel wheels, a controller, a position sensing system that generates a hitch position history comprising a stored set of recent positions of the hitch point, and a steering angle actuator, the method comprising:
   maintaining a history of positions of the hitch;
   determining a target steering angle for the supplemental steering element; and
   actuating the steering angle actuator in accordance with the target steering angle,
   wherein during the maintaining the history of positions of the hitch, the history of positions of the hitch is updated by performing a rotation operation and a translation operation on a set of coordinates of the history corresponding to previous hitch positions,
   wherein the set of coordinates of the history are specified in a current reference coordinate system,
   wherein the rotation operation and translation operation are based upon a rotation and a translation between:
      a first position corresponding to a previous hitch position corresponding to the current reference coordinate system, and
      a second position corresponding to an updated hitch position corresponding to an updated reference coordinate system.

2. The method of claim 1 wherein the rotation and the translation are calculated based upon a set of at least two sensors positioned on the trailer.

3. The method of claim 2 wherein the set of at least two sensors comprises at least a first linear movement sensor.

4. The method of claim 3 wherein the set of at least two sensors comprises at least a rotation sensor.

5. The method of claim 3 wherein the set of at least two sensors comprises at least a second linear movement sensor.

6. The method of claim 1 wherein the target steering angle is determined based upon a target position taken from the history of positions of the hitch in the current reference coordinate system.

7. The method of claim 6 wherein the target position is a closest hitch position from a set of candidate hitch positions in the history of positions of the hitch in the current reference coordinate system.

8. The method of claim 7 wherein the set of candidate hitch positions is restricted by a maximum steering angle limit for the target steering angle.

9. The method of claim 7 wherein the set of candidate hitch positions is restricted by a minimum distance requirement between a first fixed position relative to the trailing implement and a potential candidate hitch position from the history of positions of the hitch.

10. The method of claim 1 wherein the trailing implement has only one axle.

11. The method claim 1 wherein the supplemental steering element changes an angle of a steerable pair of wheels on the trailing implement.

12. The method of claim 1 wherein the supplemental steering element modulates a rotation angle at a rotatable pivoting connection point (y) between the trailing implement and a drawbar, wherein the drawbar is connectable, at a hitch point (z), to a pulling source.

13. A trailing implement steering control system for carrying out a controlled supplemental steering, by actuation of a supplemental steering element, of a trailing implement connectable via a hitch to a pulling source, and wherein the trailing implement includes a pair of parallel wheels, and a steering angle actuator, wherein the trailing implement steering control system comprises:
a controller; and
a position sensing system providing sensor signals to the controller,
wherein the controller generates a hitch position history comprising a stored set of recent positions of the hitch point in a current reference coordinate system, and
wherein the controller executes programmed instructions provided on a non-transitory computer readable medium to facilitate the trailing implement steering control system carrying out a method comprising:
maintaining a history of positions of the hitch;
determining a target steering angle for the supplemental steering element; and
actuating the steering angle actuator in accordance with the target steering angle,
wherein during the maintaining the history of positions of the hitch, the history of positions of the hitch is updated by performing a rotation operation and a translation operation on a set of coordinates of the history corresponding to previous hitch positions,
wherein the set of coordinates of the history are specified in a current reference coordinate system,
wherein the rotation operation and translation operation are based upon a rotation and a translation between:
a first position corresponding to a previous hitch position corresponding to the current reference coordinate system, and
a second position corresponding to an updated hitch position corresponding to an updated reference coordinate system.

14. The system of claim 13 wherein the rotation and the translation are calculated based upon a set of at least two sensors positioned on the trailer.

15. The system of claim 14 wherein the set of at least two sensors comprises at least a first linear movement sensor.

16. The system of claim 15 wherein the set of at least two sensors comprises at least a rotation sensor.

17. The system of claim 15 wherein the set of at least two sensors comprises at least a second linear movement sensor.

18. The system of claim 13 wherein the target steering angle is determined based upon a target position taken from the history of positions of the hitch in the current reference coordinate system.

19. The system of claim 18 wherein the target position is a closest hitch position from a set of candidate hitch positions in the history of positions of the hitch in the current reference coordinate system.

20. The system of claim 19 wherein the set of candidate hitch positions is restricted by a maximum steering angle limit for the target steering angle.

21. The system of claim 19 wherein the set of candidate hitch positions is restricted by a minimum distance requirement between a first fixed position relative to the trailing implement and a potential candidate hitch position from the history of positions of the hitch.

22. The system of claim 13 wherein the trailing implement has only one axle.

23. The system claim 13 wherein the supplemental steering element changes an angle of a steerable pair of wheels on the trailing implement.

24. The system of claim 13 wherein the supplemental steering element modulates a rotation angle at a rotatable pivoting connection point (y) between the trailing implement and a drawbar, wherein the drawbar is connectable, at a hitch point (z), to a pulling source.

* * * * *